United States Patent [19]

Baumbach

[11] 3,975,664

[45] Aug. 17, 1976

[54] LINE PROTECTOR FOR COMMUNICATION CIRCUIT

[75] Inventor: Bertram W. Baumbach, Arlington Heights, Ill.

[73] Assignee: Reliable Electric Company, Franklin Park, Ill.

[22] Filed: July 28, 1975

[21] Appl. No.: 599,700

[52] U.S. Cl. .................................... 317/66; 317/16; 317/61.5; 337/18; 337/32; 337/33; 337/34

[51] Int. Cl.[2] ......................... H02H 3/22; H02H 7/20

[58] Field of Search ................ 317/66, 16, 61.5, 61, 317/62, 40 A; 337/32, 33, 34, 18, 20, 31

[56] References Cited

UNITED STATES PATENTS

| | | | |
|---|---|---|---|
| 2,724,793 | 11/1955 | Fisher | 337/31 X |
| 3,254,179 | 5/1966 | Howard | 337/18 |

*Primary Examiner*—J D Miller
*Assistant Examiner*—Patrick R. Salce
*Attorney, Agent, or Firm*—Olson, Trexler, Wolters, Bushnell & Fosse, Ltd.

[57] ABSTRACT

A line protector includes a body having first and second end terminals and an intermediate terminal for connection to a ground potential. End caps are mounted on the end terminals and have peripheral edges maintained spaced from the intermediate terminal by means of a displaceable element responsive to excessive currents in the line being protected. High currents will cause the end caps to move toward the intermediate terminal and provide a short circuit therewith to ground to protect telephone equipment connected thereto. The intermediate terminal is mounted in a clip which has centering means formed therein to maintain the mechanical and electrical spacing of the intermediate terminal with respect to the end caps equal to one another. The protector assembly is mounted with a standard housing and base structure to be interchangeable with existing central office plug-in protectors.

9 Claims, 8 Drawing Figures

LINE PROTECTOR FOR COMMUNICATION CIRCUIT

BACKGROUND OF THE INVENTION

The present invention relates generally to protectors of the type used in central office telephone switching equipment. These protectors serve to protect the inside equipment from damage as a result of overvoltage and overcurrent conditions that may occur on the outside lines. Examples of such protectors are shown in U.S. Pats. No. 3,743,888 issued July 3, 1973; 3,573,695 issued Apr. 6, 1971; 3,587,021 issued June 2, 1971; and 3,849,750 issued Nov. 19, 1974.

Protectors of the foregoing type sometimes employ an in-line heat coil which heats a fuseable solder element. This solder element melts during an overcurrent line condition in a relatively short period of time when a marginal overcurrent condition exists. However, this requires additional heating current to be applied to the protector and, in some instances, complicates the wiring of the central office equipment. A spring within the protector is used to bring a pair of contacts together to form a direct metallic circuit from the line to ground. Under such conditions a spring is frequently relied upon to carry large overload currents of long duration. It has not always been satisfactory since the spring may not be able to carry the requisite current. In addition the heating of the spring from the overcurrent may cause it to lose its temper, resulting in separation or loose engagement with the associated pair of contacts.

Also, it is desirable that the circuit path within the protector be as short as possible and with as few as possible surface to surface contacts. Such arrangement tends to reduce the noise on the line during normal operating conditions. In the past, protectors with the heat coils have sometimes tended to be noisy due to unnecessary long current paths and multiple surface-to-surface contacts of components in the line circuit within the protector.

Another problem with line protectors of the type with which the present invention is concerned lies in the need for simplification of the insertion of the subassemblies into a protector housing of standard configuration so as to reduce the cost of manufacture of the protector. Different user requirements frequently necessitate variations in the internal structure of the protector, and, therefore, it is important of have a protector design which is versatile but which can be used on standard 5 pin base and housing structures. For example, some versions of the protector required carbon electrodes while others require the use of gas filled tubes. Moreover heat coils may or may not be required. In any event, it is preferable that protector units of the type disclosed herein be designed with a certain number of standardized or common parts so that numerous variations of the protector can be easily made.

SUMMARY OF THE INVENTION

Accordingly, it is an object of this invention to provide a new and improved telephone line protector of the voltage breakdown type which eliminates the need of a heating coil and which provides relatively fast operation upon sensing overvoltage or overcurrent in the line.

Still another object of this invention is to provide a new and improved telephone line protector which is relatively small and compact in configuration to enable a multitude of such protectors to be mounted on a single protector panel.

Another object of this invention is to provide protector structure which is simple and inexpensive to manufacture while being efficient and reliable in use and which is mounted in a standard base and housing structure.

Yet another object of the invention is to provide a telephone line protector which can be assembled in a relatively short period of time as a result of the minimum number of components required.

Briefly, the foregoing objects are brought about by providing a line protector which comprises a housing of insulating material including a base, line connector pins extend through the base and the ground connector pin extends through the base with overvoltage protector means electrically connected between each of the line connector pins and the ground connector pin. Caps are movably held in place at end terminals of the protector body and urged toward a central intermediate terminal by a leaf spring within the housing. The caps are normally maintained equally spaced apart from opposite sides of a mounting clip that engages the intermediate terminal to provide high impedances (viz. a large air gap) between the caps and the clip. When an overcurrent condition occurs the current will flow through the end cap and a meltable solder slug positioned therein. Flow of the solder will cause the end caps to move toward and engage with the mounting clip electrically connected to the intermediate terminal to provide a grounded condition of the telephone lines. More advantageously the clip is provided with centering means, preferably in the form of a slot or detent, to engage an annular ring forming the intermediate terminal of the protector. This centering means insures proper spacing between the end caps and the mounting clip.

Detailed description of the Illustrated Embodiment

Figure 1:
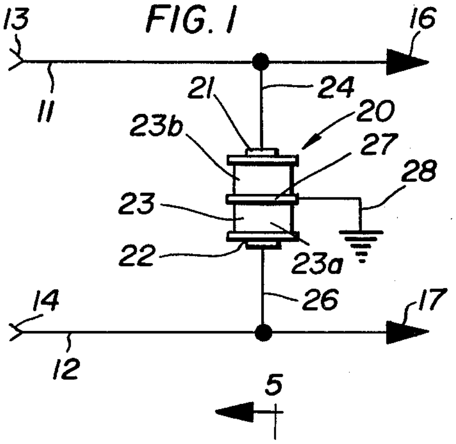
FIG. 1 is a simplified schematic diagram illustrating a telephone line pair with a protector device connecting each line to ground in an overvoltage and/or overcurrent condition.

Referring now to FIG. 1 there is seen a simplified circuit diagram of a telephone line pair with the protector of the present invention illustrated somewhat diagrammatically and connected therebetween. The telephone line pair includes a first line 11 and a second line 12 in communication between outside telephone lines as applied to terminals 13 and 14, respectively and for connection to central office equipment as applied to terminals 16 and 17. A protector unit or element 20 has end terminals 21 and 22 formed on a cylindrical central body portion 23. The end terminals 21 and 22 are coupled to lines 11 and 12 by means of conductors 24 and 26, respectively. An intermediate terminal 27 is formed on the protector and provides means for connecting to ground potential over a line circuit 28.

Preferably, the protector element 20 consists of a cold cathode gas tube having portions contained within the cylindrical body 23, said portions being identified by reference numerals **23*a* and 23*b*. When an overvoltage condition occurs the gas within the portions 23*a* and 23*b* ionize to provide a short-circuit path along lines 26 and 24 to the line 28 and ground potential. During a sustained overcurrent condition the end terminals 21 and 22 will be short-circuited to terminal 27** in a manner to be described hereinbelow. This overcurrent short circuit condition is a permanent condition and requires the protector to be repaired or replaced.

Figure 2:
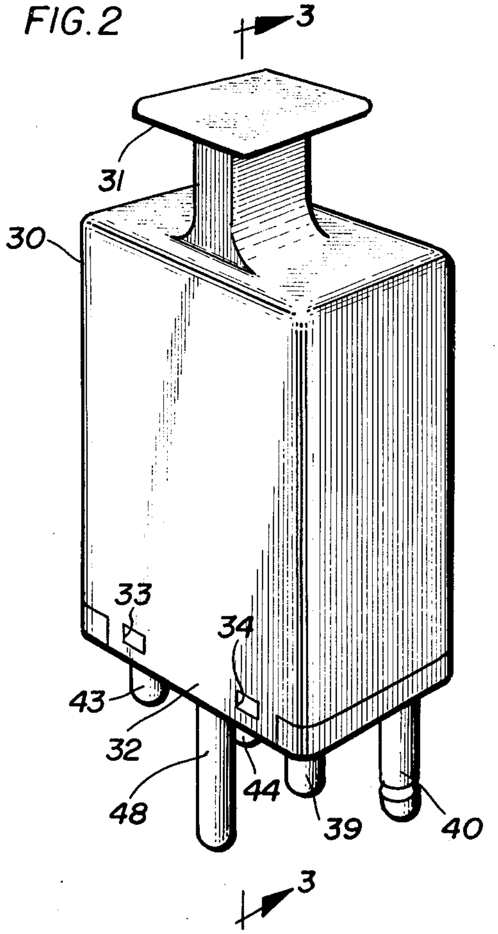
FIG. 2 is an exterior perspective view of the protector housing and base of this invention wherein the protector unit is contained.
Figure 3:
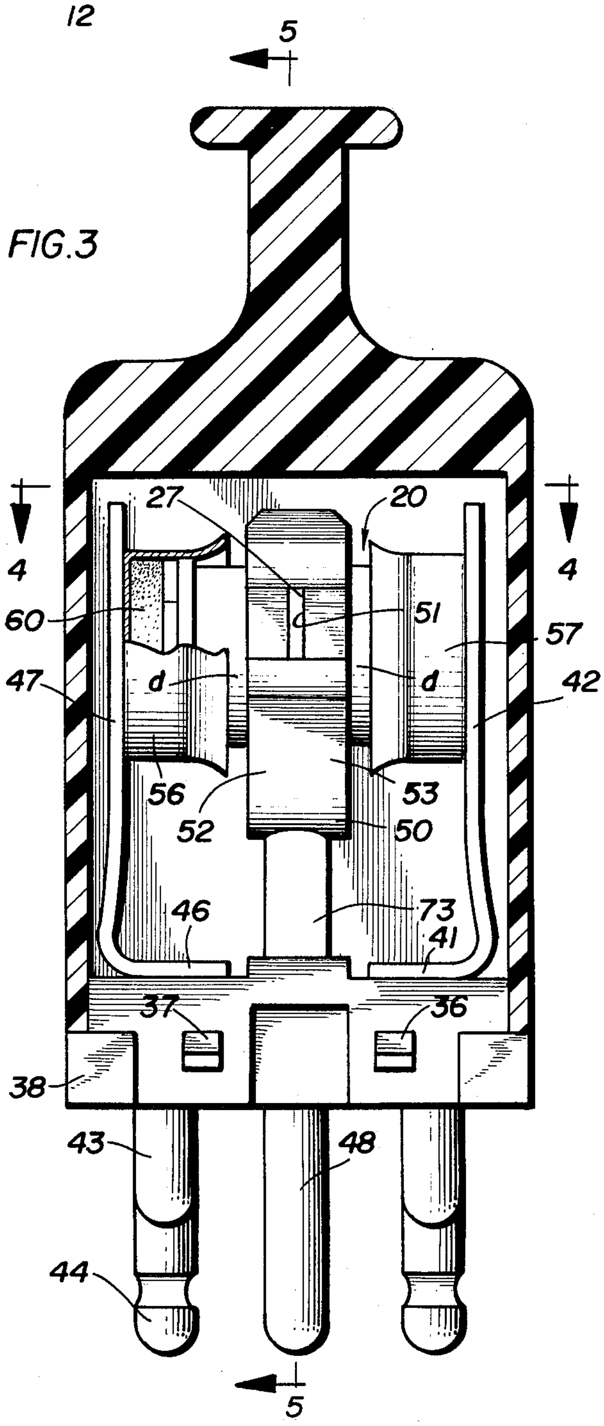
FIG. 3 is a sectional view on an enlarged scale taken along line 3—3 of FIG. 2 showing the protector structure and mounting terminal clips associated therewith.

Referring now to FIG. 2 the protector of the present invention is mounted within a standard plastic housing 30 having a hand gripping top end portion 31 to facilitate plug-in insertion and removal of the protector in a panel of the type well known in the art. Such a panel is usually one having for each protector module six pin sockets disposed in a generally rectangular pattern on the panel, plus a dummy or polarizing pin socket. The housing 30 has a lower end portion 32 provided with apertures 33 and 34 to engage protruberances 36 and 37, respectively formed on a base 38. The housing is, therefore, securely held to the dielectric plastic base 38. A plurality of pins extend from the base 38 in a standard configuration for insertion into the correspondingly shaped pin holes formed in a protector panel. Pins 39 and 40 are staked or otherwise electrically connected together by a common connection to a bent portion 41 of a leaf spring connect element 42. Similarly, pins 43 and 44 are electrically connected together by a connection to a common bent end portion 46 of a second leaf spring terminal connector element 47. A fifth pin 48 extends through the base and has connected at one end thereof a clip member 50 which, in turn, is intended to engage firmly and make electrical contact with the center terminal 27 of the protector 20.

The terminals 40 and 44 are preferable connected to the incoming line while terminals 39 and 43 are connected to the central office equipment. Terminals 40 and 39 form a first incoming line terminal and a first opposing outgoing line terminal, respectively, while terminals 44 and 43 form a second incoming line terminal and a second opposing outgoing line terminal. The terminals 39, 40, 43 and 44 have their axes projecting parallel to one another at the intersection of the base 38. The terminals 39, 40, 43 and 44 form the four corners of a rectangle. The ground terminal formed by the lower or projected portion of the pin 48 extends from the base with its axis parallel to the axes of the pins 39, 40, 43 and 44. Also the projected part of grounding pin 48 falls along a line between the pins 43 and 39 and which forms the long side of the rectangle formed by the four pins 39, 40, 43, 44.

The clip 50 has a centering window or cut-out 51 which engages the annular configuration of terminal 27. By providing a centering window or cut-out 51 in the clip 50, the lateral edges 52 and 53 of the clip are maintained uniformly spaced from the end caps 56 and 57, respectively. In the illustrated embodiment this spacing (designated by reference letter "d") is in the order of about 0.030 to 0.040 inches.

Figure 4:
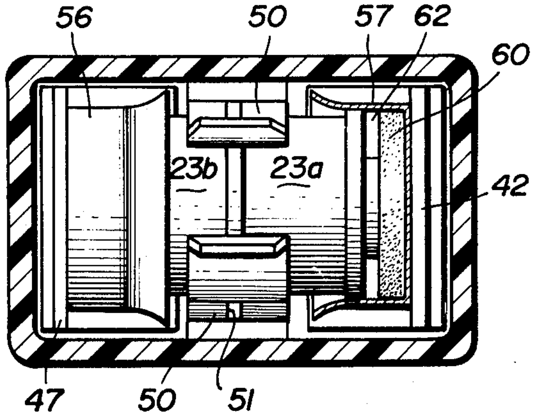
FIG. 4 is a sectional view taken along line 4—4 of FIG. 3.
Figure 6:
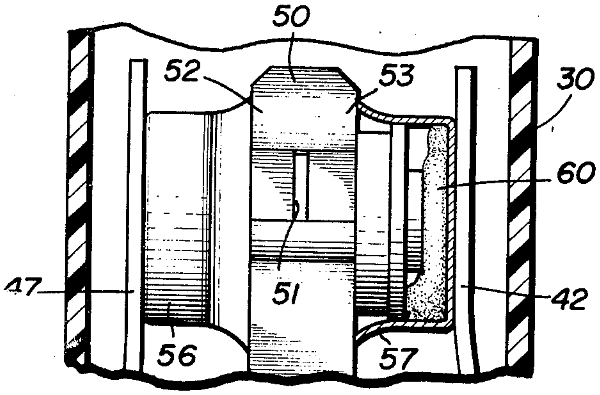
FIG. 6 is an enlarged partially sectional view of the protector of FIGS. 3, 4 and 5 in a short circuit condition after an overcurrent condition has occurred.

As best seen in FIG. 4 the caps 56 and 57 are maintained in their spaced position relative to the clip 50 by means of a meltable material such as slug elements 60,60. Preferably the slug 60 is formed of low melting temperature solder. When high current passes from the spring clip terminal 42 through the cap 57 and the meltable slug 60 and into the gas tube portion **23*a*, and therefrom to the clip 50 and to the ground pin 48, heat will be generated. The slug 60 will melt and flow and allow the cap 57 to move under the spring bias force of the leaf spring connector 42. This will cause the cap 57 to short circuit with the clip 50, as seen in FIG. 6. When the overcurrent condition is from cap 56 to ground the slug 60 within the cap 56 melts allowing cap 56 to contact cap 50.**

Referring again to FIG. 4 the cap of 57 is shown having a predetermined volume as designated by reference numeral 62. Preferably, the volume 62 is such as to accept the volume of material formed by the slug 60 and enable the cap 57 to move toward the clip and engage the same. The cap 56 is provided with a slug in the same manner, and therefore a detailed explanation is not deemed necessary.

Figure 5:
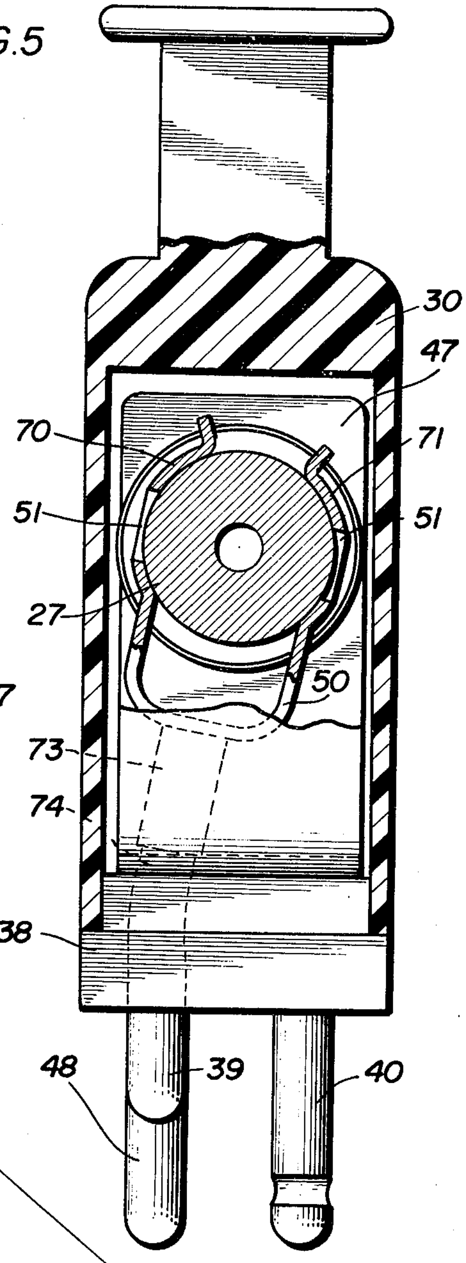
FIG. 5 is a sectional view taken along line 5—5 of FIG. 4.
Figure 7:
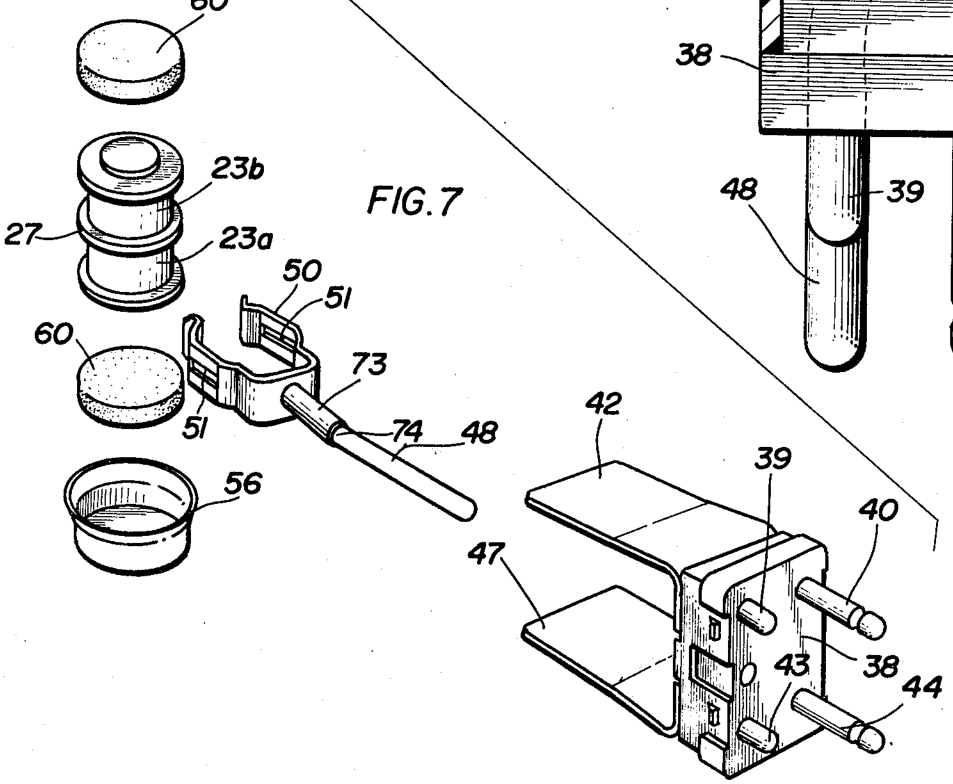

Referring to FIG. 5 the clip 50 is preferably joined to a bent pin to enable the entire protector structure to be maintained in the same common housing and base as protector structures of prior designs. Accordingly, the protector structure of this invention plugs into standard central office protector terminal boards. It will also be noted that the slot or window 51 on the clip 50 is formed on both sides of the clip. The clip has an arcuate portion 70 and 71 on both sides thereof and is substantially of the same radius of curvature as that of the cylindrical body forming the protector housing. The annular ring forming the intermediate terminal 27 is received in each of the windows 51 and provides electrical contact therewith. The windows 51 are sized to insure positive continuous electrical contact and prevent the insulating material of the gas tube from interfering therewith. To minimize the extent to which the protector unit is inserted between the leaf spring contact elements 42 and 47, a stop sleeve 73 is positioned over the bent portion 74 of the pin 48. The stop sleeve 48 therefore moves downwardly to engage the inside of the base 38 and limit the extent of insertion of the protector between the associated spring contact elements. FIG. 7 illustrates an exploded perspective view of the protector structure of this invention and clearly illustrates the simplicity of design and structure.

Figure 8:
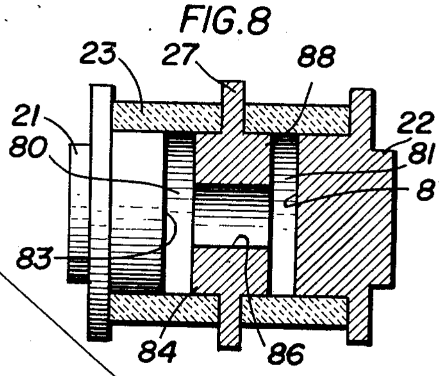
FIG. 7 is an exploded perspective view of the protector unit structure of this invention and FIG. 8 is a sectional view of a gas tube device used in this invention.

FIG. 8 is a sectional view of a gas tube protruberance which can be used in accordance with this invention. The cylindrical body portion 23 of insulating material provides two gas chambers 80 and 81. The end terminal 21 has an electrode surface 83 spaced from an electrode surface 84 associated with the intermediate terminal 27. The electrode surface 84 is annular in configuration and the gas chamber 80 is in communication with the chamber 81 through an aperture 86. In like manner, the end terminal 22 has an electrode surface 87 spaced from an electrode surface 88 associated with the intermediate terminal 27. The spacing between the electrode surfaces 83 and 84 and the electrode surfaces 87 and 88 together, among other things, determines the voltage at which the gas tube will break down and conduct. The gas tube is generally a cold cathode discharge device.

What has been described is a simple and efficient telephone line protector which provides both overvoltage and overcurrent protection of a telephone line. The overvoltage protection is obtained from gas tubes as illustrated herein. However, it will be understood that carbon arc-gap protectors may be utilized as is well known it the art. The overcurrent protection is obtained by providing meltable material, such as solder, within caps which are movable toward the central clip upon sensing a current above a predetermined minimum value. While a single specific embodiment of the invention has been described herein it will be understood that variations and modifications may be effected without departing from the spirit and scope of the novel concepts as set forth in the following claims.

The invention is claimed as follows:

1. A line protector for a communication circuit comprising: a protector unit having a body, first and second end terminals on said body, line terminals connected to said end terminals and arranged for connection to a pair of communication lines, a third intermediate terminal on said body, a ground terminal connected to said intermediate terminal, said protector unit including electrodes forming a part of said terminals and comprising breakdown voltage means in the circuit between said first and third terminals and in the circuit between said second and third terminals to provide a high impedance at a voltage below a predetermined value and a low impedance at a voltage above said predetermined value, conductive caps positioned over said end terminals and each having a portion extending over said body toward opposite sides of said intermediate terminal, said conductive caps each being spaced from said opposite sides of said intermediate terminal to provide high impedances therebetween, spring-bias means secured to said line terminals and extending therefrom to provide electrical contact with said caps and to apply longitudinal forces on said caps to move said caps toward said intermediate terminal, and means within each of said caps opposing said spring-bias means for maintaining said spaces when the current between said end terminals and said intermediate terminal is below a predetermined minimum value but operable to cause at least one of said caps to move toward said intermediate terminal to form a direct metallic ground circuit therewith when the current between said end terminals and said intermediate terminal is above said predetermined minimum value.

2. A line protector for a communication circuit as set forth in claim 1 further including clip means mounted on said ground terminal and engageable with said intermediate terminal, said clip means having opposed peripheral edges thereof defining said spaces with said caps, said clip means including centering means for engaging said intermediate terminal and maintaining said spaces between said opposed peripheral edges of said clip means and said caps uniform, said caps engaging said clip means when said means within said caps is melted by heat resulting from a current above said predetermined minimum value.

3. A line protector for a communication circuit as set forth in claim 2 further including a base for receiving said line terminals and said ground terminal, and wherein said ground terminal is bent intermediate its length to enter said base perpendicular thereto from a location displaced from the center of the base beneath the intermediate terminal of the protector unit.

4. A line protector for a communication circuit, comprising: a housing of dielectric material and including a base, line protector pins in said base, a ground protector pin in said base, a protector unit having a body in spaced relation with said base, first and second terminals on said body for connection to said line connector pins and an intermediate terminal on said body for connection to said ground connector pin, said protector unit including electrodes forming portions of said terminals and comprising voltage breakdown means in the circuit between each of said line connector pins and said ground connector pin to provide in each of said circuits a high impedance at a voltage below a predetermined value and a low impedance at a voltage above said predetermined value, conductive caps positioned over said end terminals and each having a portion extending over said body toward opposite sides of said intermediate terminal, said conductive caps each being spaced from said opposite sides of said intermediate terminal to provide high impedances therebetween, spring-bias means secured to said line connector pins and extending therefrom to provide an electrical connection with said caps and to apply longitudinal forces on said caps to move said caps toward said intermediate terminal, and means within each of said caps opposing said spring bias means for maintaining said spaces when the current between said end terminals and said intermediate terminal is below a predetermined minimum value but operable to cause at least one of said caps to move toward said intermediate terminal to form a direct metallic ground circuit therewith when the current between said end terminals and said intermediate terminal is above said predetermined minimum value.

5. A line protector for a communication circuit as set forth in claim 4 further including clip means mounted on said ground connector pin and engageable with said intermediate terminal, said clip means having opposed peripheral edges thereof defining said spaces with said caps, said clip means including said centering means for engaging said intermediate terminal and maintaining said spaces between said peripheral edges of said clip means and said caps uniform, said caps engaging said clip means in response to a current above said predetermined minimum value passing between said caps and said intermediate terminal.

6. A line protector for a communication circuit as set forth in claim 5 wherein said ground connector pin engaging said clip means is bent at an intermediate point along its length to enable said pin to enter said base perpendicular thereto from a location displaced from the center of said base beneath said intermediate terminal.

7. A plug-in type line protector for a communication circuit comprising a dielectric base having a first incoming line terminal and a first opposing outgoing line terminal, a second incoming line terminal and a second opposing outgoing line terminal, said terminals comprising four pins projecting from said base and having respectively parallel axes that intersect the base to define substantially the four corners of a rectangle, a ground terminal comprised of a pin projecting from the base intermediate two of said four pins and with the axis of the projected part of the ground pin being parallel to the axes of said four pins, the path between said last-mentioned two pins defining substantially the longer dimension of said rectangle and passing through the axis of the projected part of said ground pin, a protective device of the voltage breakdown type having end electrodes and a center electrode and with there being an arc gap between the center electrode and each of the end electrodes, electrically conductive grounding means connecting said center electrode to said ground pin, electrically conductive means connecting each end electrode to one pair of associated line terminal pins thereby to provide an arc gap to ground from each line terminal, electrically conductive caps over said end electrodes, means biasing said caps toward said grounding means, and meltable means for normally maintaining said caps spaced from said grounding means an amount sufficient to prevent an electrical circuit therebetween but allowing direct contact of at least one of said caps with said grounding means upon there being an overcurrent condition in the circuit between either pair of associated line terminals.

8. A line protector according to claim 7 including means on said grounding means engaging said center electrode for insuring substantially uniform spacing between the end caps and the grounding means in normal operation of the protector.

9. A line protector according to claim 7 in which said electrodes are part of a cold cathode tube.

* * * * *